United States Patent [19]

Paquette

[11] 4,344,997

[45] Aug. 17, 1982

[54] ARTISTS' MEDIUM

[76] Inventor: Rolland Paquette, P.O. Box 58 (Hwy. 69 North), Val Caron, Ontario, Canada

[21] Appl. No.: 178,219

[22] Filed: Aug. 14, 1980

Related U.S. Application Data

[63] Continuation of Ser. No. 816,369, Jul. 18, 1977, abandoned.

[30] Foreign Application Priority Data

Jun. 7, 1977 [CA] Canada .................................. 279993

[51] Int. Cl.³ ........................... B32B 3/30; B32B 3/28

[52] U.S. Cl. .................................... 428/161; 428/156; 428/172; 428/174; 428/224

[58] Field of Search ............... 428/161, 156, 162, 172, 428/174, 211, 537, 224; 156/59, 209; 40/160, 154, 158 R

[56] References Cited

U.S. PATENT DOCUMENTS

| | | | |
|---|---|---|---|
| 449,727 | 4/1891 | Burner | 156/59 |
| 3,287,193 | 11/1966 | Klein | 428/161 |
| 3,501,362 | 3/1970 | Walker | 428/211 |
| 3,964,946 | 6/1976 | Falk | 156/59 |

FOREIGN PATENT DOCUMENTS

| | | | |
|---|---|---|---|
| 19847 | 4/1900 | Switzerland | 40/160 |

*Primary Examiner*—Paul J. Thibodeau
*Attorney, Agent, or Firm*—Berman, Aisenberg & Platt

[57] ABSTRACT

An artist's medium comprising a rigid backing of non-planar surface, an artist's worksheet and a means for securing the sheet flush to the surface of the backing so that the artist's worksheet has the non-planar contour of the surface of the backing. This medium permits an artist to produce a painting or form of art work on a working surface, portions of which have a different spatial relation, depthwise, with other portions thereof.

2 Claims, 5 Drawing Figures

ARTISTS' MEDIUM

This is a continuation of application Ser. No. 816,369 filed July 19, 1977, now abandoned.

BACKGROUND OF THE INVENTION

This invention relates generally to an artist's medium and more particularly concerns a working medium for an artist which will permit more three-dimensional effects in paintings or drawings.

The traditional artist's working medium comprises a canvas or other worksheet mounted in flat, planar form, the artist working on a flat surface and his creation being displayed in this flat form.

There have been numerous previous attempts to provide a more effective means for artists to display three-dimensional features in pictures or paintings, including for example a three-dimensional picture display which provides for the viewing of superposed tracing sheets on which duplicate pictures have been traced or printed through coloured lenses, in U.S. Pat. No. 2,873,545, of A. E. Noel, issued: Feb. 17, 1959; and a picture display means wherein a transparent, arcuate plate, on which a partial picture has been painted is set before a flat picture plate on which the remaining picture appears, to give depth perception, described and illustrated in G. M. Tarzian, U.S. Pat. No. 2,731,749, issued: Jan. 24, 1956. Additionally Canadian Pat. No. 110,815 of Frank Feher, issued: Mar. 17, 1908 describes an embossed picture comprising a foundation plate having secured thereto an embossed piece of celluloid suitably colour painted or printed.

These devices do not provide a standard artist's working medium. Instead they require sheets or plates which are of spcial material or are appropriately decorated, and are positioned in spaced relationship over a base or further transparent sheet, itself appropriately artistically decorated, to achieve the effect of depth.

Another reference of background interest is U.S. Pat. No. 2,862,322 of W. C. Ziegler, issued Dec. 2, 1958 which describes a frame structure for postcards which holds the postcards in curved form for displaying.

Accordingly it is the primary aim of the present invention to provide an artist's working medium comprising a traditional artist's work sheet with which the artist will be familiar, and yet at the same time permit the artist to achieve more of a sensation of depth in his creation than would be the case on a traditional flat surface working medium.

SUMMARY OF THE INVENTION

In accordance with the invention, an artist's working medium is provided comprising a rigid backing of non-planar surface, an artist's work sheet, and means for securing that work sheet flush to the surface of the backing so that the work sheet has the same non-planar contour as the surface of the backing. The work sheet will normally be canvas, artist's paper or any other appropriate material for an artist's worksheet which can be appropriately secured to the non-planar surface of the backing.

The non-planar surface of the rigid backing may be any appropriate surface such as a concave or convex surface or other surfaces of a multifaceted or irregular nature.

BRIEF DESCRIPTION OF THE DRAWINGS

Other objects and advantages of the invention will become apparent upon reading the following detailed description and upon referring to the drawings in which.

In the drawings similar features have been given similar reference numerals.

While the invention will be described in connection with example embodiments, it will be understood that it is not intended to limit the invention to those embodiments. On the contrary, it is intended to cover all alternatives, modifications and equivalents as may be included within the spirit and scope of the invention as defined by the appended claims.

DETAILED DESCRIPTION OF THE INVENTION

Figure 1:
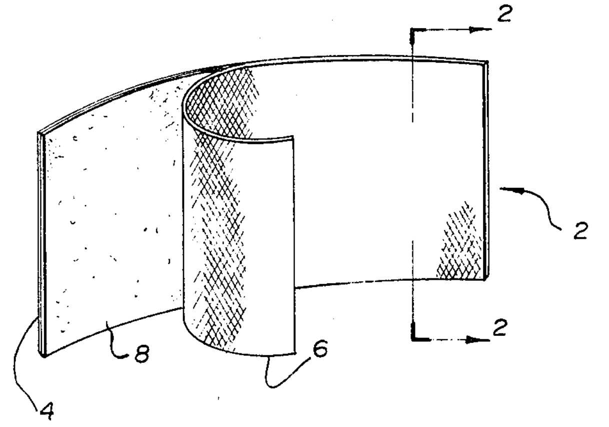
FIG. 1 is a perspective view of an artist's medium having a concave shape according to the canvas being partially lifted to better show its construction the present invention.
Figure 2:
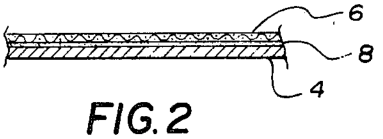
FIG. 2 is a cross-sectional view of the artist's medium of FIG. 1 taken along line 2—2.

Turning first to FIG. 1, there is shown an artist's medium 2 of generally concave, non-planar contour. The medium is made of a rigid backing 4 (for example an appropriately curved piece of masonite or wood having an appropriately curved surface). In this embodiment illustrated canvas 6 is secured to backing 4 by means of adhesive 8, (FIG. 2) canvas 6 being flush with the surface of the backing.

Figure 3:
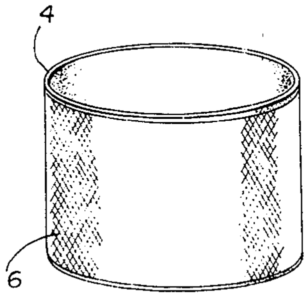
FIGS. 3 and 4 are perspective views of alternative embodiments of the artist's medium according to the present invention.
Figure 4:
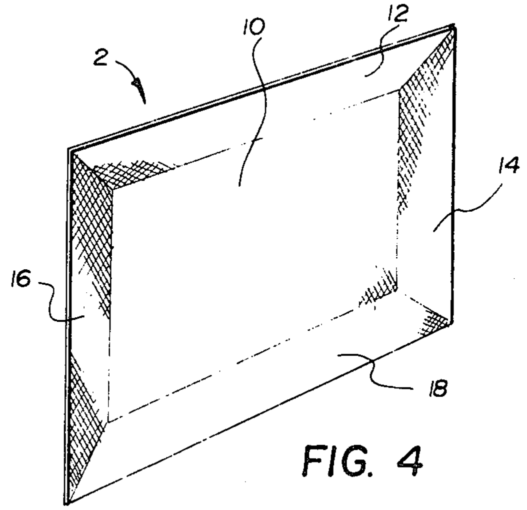

FIG. 3 illustrates an artist's medium having a concave surface, the device being, overall, of cylindrical shape so that an appropriate rotation means associated with this device will enable an artist's mural drawn on the outer surface of the medium to be constantly rotated before a viewer's eyes. FIG. 4 illustrates a medium 2 having a rectangular base 10 with planar sides 12, 14, 16 and 18 adjacent thereto. Each of these sides is flared integrally from base 10 above the plane of the surface of the base at an angle thereto such that all of the upper surfaces of the work sheet secured to the backing may be seen at one time by a viewer. Although not shown, it is within the scope of the present invention to provide a triangular base or indeed a base of any other geometric form having similarly arranged sides.

Figure 5:
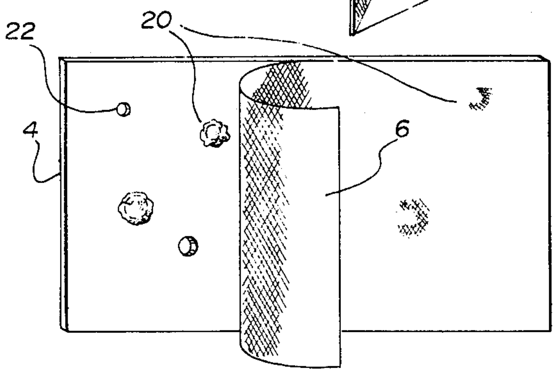
FIG. 5 is a perspective view of a further embodiment of the present invention, its canvas again being partially lifted to better show its construction.

Turning to FIG. 5 there is shown a further embodiment of the present invention wherein the non-planar surface of the rigid backing is provided by bulbous protrusions 20 appearing at appropriate locations on the rigid backing. These protrusions may of course be of any shape and location to suit the artist's purposes.

As can be understood from FIG. 5, one method of achieving such a non-planar surface would be to apply flexible artist's canvas 6 to backing 4, holes 22 being located at appropriate locations in backing 4 so that a foam or other solidifiable material may be blown or extruded through the hole to produce the bulbous surface between backing 4 and canvas 6. Conversely, holes 22 or any other appropriate depressions in backing 4 may be provided, with the canvas being pushed into the holes or depressions to form a pitted canvas surface.

It will be understood that, by using an artist's medium according to the present invention, an artist will be provided with a novel work form. The non-planar contours of the mediums according to the present invention will enable such artist to enhance the aspect of depth in his artistic creations on such mediums and broaden the design possibilities available to him in carrying out his work.

Thus it is apparent that there has been provided, in accordance with the present invention, an artist's medium that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly it is intended to embrace all such alternatives, modifications and variations as fall within the spirit and broad scope of the appended claims.

I claim as my invention:

1. A laminated artists' medium consisting of:

a rigid non-planar backing ahving a surface contour selected from one of the following shapes: a concave shape, a convex shape, a rectangular base with planar sides adjacent thereto, each side flared integrally from the base above the plane of the surface of the base at an angle thereto so that the base and sides are visible at one time by the viewer, and a triangular base with planar sides adjacent thereto, each side extending integrally from the base above the plane of the surface of the base at an angle thereto so that the base and sides are visible at one time by the viewer;

a flexible artists' canvas worksheet;

adhesive means for securing said worksheet to said rigid backing, applied between the underside of the artists' canvas worksheet and the backing, the canvas worksheet being thereby secured flush and conforming to the entire surface of the backing and forming a laminate in which the canvas worksheet has the same nonplanar contours as the surface of the backing.

2. A laminated artists' medium consisting of:

a rigid backing having a non planar surface provided with a plurality of spaced protuberances or spaced depressions;

a flexible artists' canvas worksheet;

adhesive means for securing said worksheet to said rigid backing, applied between the underside of the artists' canvas worksheet and the backing, the canvas worksheet being thereby secured flush and conforming to the entire surface of the backing and forming a laminate in which the canvas worksheet has the same non planar contours as the surface of the backing.

* * * * *